United States Patent [19]

Chattin

[11] Patent Number: 4,851,983
[45] Date of Patent: Jul. 25, 1989

[54] KVP REGULATOR AND RESONANT CIRCUIT FOR HIGH FREQUENCY MEDICAL X-RAY GENERATOR

[75] Inventor: Robert A. Chattin, Mundelein, Ill.

[73] Assignee: Gendex Corporation, Franklin Park, Ill.

[21] Appl. No.: 149,136

[22] Filed: Jan. 27, 1988

[51] Int. Cl.$^4$ ............................................. H02M 7/515
[52] U.S. Cl. ...................................... 363/136; 363/58; 363/96; 378/112
[58] Field of Search ...................... 363/57, 58, 96, 135, 363/136, 27, 28; 378/101, 110, 112

[56] References Cited

U.S. PATENT DOCUMENTS

| | | | |
|---|---|---|---|
| 4,237,531 | 12/1980 | Cutler et al. | 363/58 |
| 4,442,483 | 4/1984 | Baumann et al. | 363/136 |
| 4,477,868 | 10/1984 | Steigerwald | 363/96 |
| 4,497,018 | 1/1985 | Rice | 363/136 |
| 4,710,860 | 12/1987 | Tsuchiya | 363/96 |

Primary Examiner—Peter S. Wong
Attorney, Agent, or Firm—Roger J. French

[57] ABSTRACT

A high voltage power supply circuit for a high frequency medical X-ray generator comprises a high voltage transformer having a primary and a secondary and an inverter circuit responsive to predetermined control input signals for producing corresponding inverter output signals. A resonant circuit is coupled with the inverter circuit and is resonsive to the inverter output signals for producing corresponding voltage pulses for energizing the primary of the high voltage transformer. The resonant circuit includes a capacitive component and an inductive component, the latter being provided by the primary of the high voltage transformer coupled in series circuit with the inverter circuit and with the capacitive component. A KVP regulator circuit provides the control input signals for the inverter circuit in the form of a series of KV firing pulses.

11 Claims, 4 Drawing Sheets

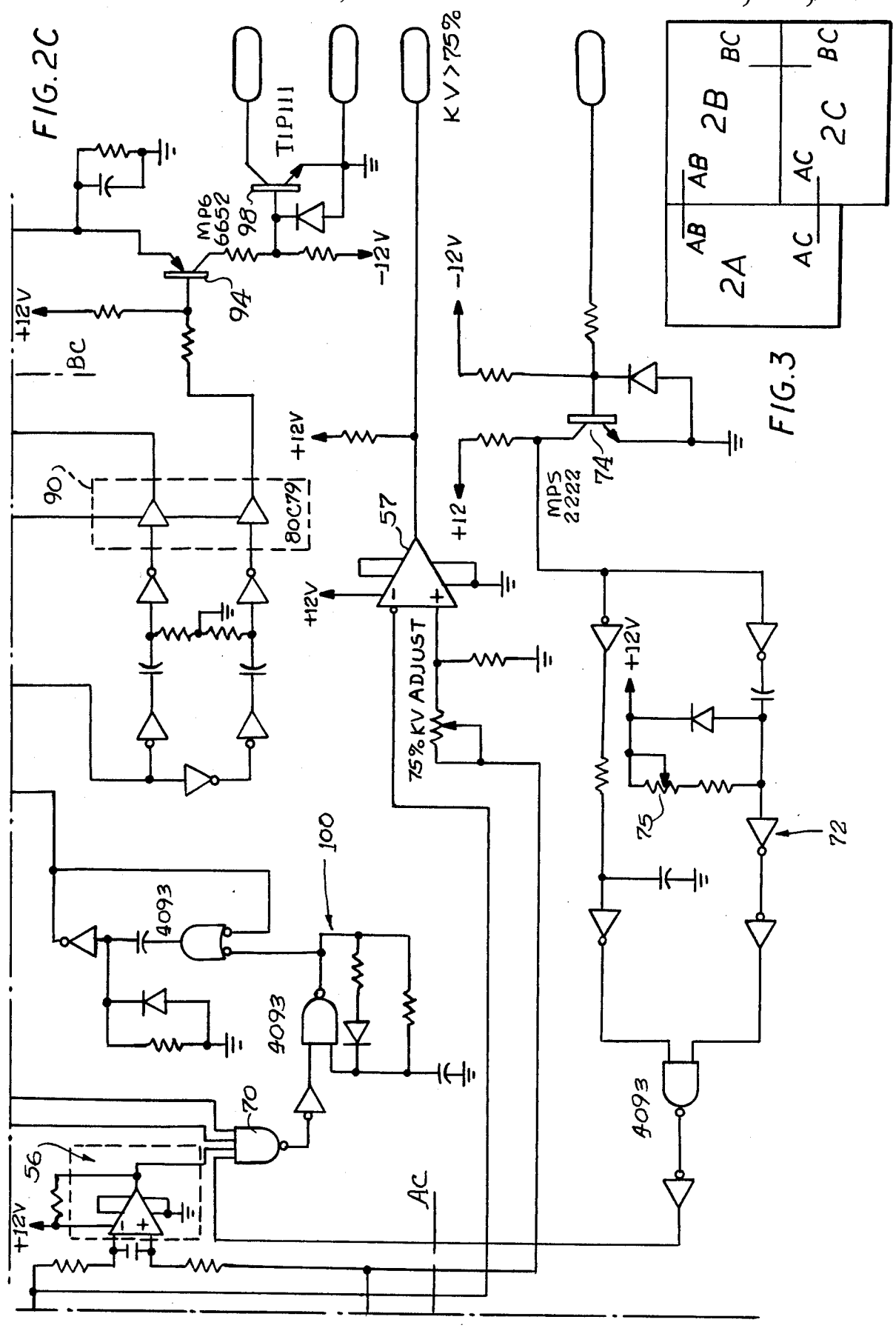

KVP REGULATOR AND RESONANT CIRCUIT FOR HIGH FREQUENCY MEDICAL X-RAY GENERATOR

BACKGROUND OF THE INVENTION

The present invention is in the field of high frequency medical X-ray generators. More particularly, the invention is directed to improvements in high frequency X-ray generators for radiographic or medical imaging applications, or so-called diagnostic X-ray equipment. More particularly yet, the invention concerns a novel high voltage power supply circuit and cooperating kilovoltage (KV or KVP) regulator circuit for regulating the production of the high voltage supply for the X-ray tube.

Heretofore, high voltage power supply circuits for X-ray generators have utilized a high voltage transformer in circuit with an inverter type power supply circuit and a resonant circuit. The resonant circuit includes a discrete inductance apart from other circuit components.

OBJECTS AND SUMMARY OF THE INVENTION

In accordance with the present invention, the high voltage transformer primary is advantageously utilized as the inductance component in the series resonant circuit, such that separate inductance components need not be utilized. This novel circuit configuration advantageously simplifies both circuit design and construction.

In accordance with another aspect of the invention, a novel KVP regulator circuit is utilized in connection with the high voltage power supply. More particularly, the KVP regulator circuit of the invention advantageously utilizes a novel KVP feedback arrangement to fire or trigger the inverter bridge portion of the high voltage power circuit. In accordance with further novel features of the invention, the KVP regulator circuit also utilizes a novel "holdoff" logic control arrangement for detecting when the inverter bridge has sent energy to the high voltage tank or resonant circuit and for preventing a second firing or triggering of the inverter bridge until some minimum time has passed to allow for the necessary turnoff time of the inverter circuit. Moreover, the novel KVP regulator circuit in accordance with the invention provides a "no KVP" protection logic to inhibit exposure if the firing of the inverter does not generate the proper KVP for the X-ray tube.

As a further advantage, the use of solid state digital logic type circuitry makes possible increased accuracy and reliability of the foregoing control functions of the KVP regulator circuitry. Moreover, the digital control logic permits the addition of further control functions in the KVP regulator circuit for achieving yet further advantageous and desireable control functions.

For example, the preferred form of the invention described hereinbelow also employs novel logic control circuits for inhibiting an exposure whenever the KV goes over a preset level by turning off the drive or trigger signals to the inverter bridge circuit. In the illustrated embodiment, the logic monitors the positive and negative KVP values of the X-ray tube to provide the foregoing overvoltage protection, and further to stabilize the KVP by comparing the monitored signal with a desired value set in by the operator on a control panel or the like. In the illustrated embodiment, the control logic also is arranged to provide a backup trigger pulse for driving or triggering the inverter bridge in the event that the normally generated trigger pulse fails to occur for some reason.

Accordingly, it is a general object of the invention to provide a novel and improved high voltage power supply circuit and KVP regulator circuit for a medical X-ray generator in accordance with the foregoing considerations.

It is a further and more specific object of the invention to provide a novel and improved high voltage power supply circuit for a high frequency medical X-ray generator comprising a high voltage transformer having a primary winding and a secondary winding; inverter circuit means responsive to a predetermined control input signal for producing a corresponding output signal; and resonant circuit means responsive to said inverter output signal for producing a voltage pulse for energizing said primary of said high voltage transformer and comprising capacitor means and inductor means, wherein the inductor means of said resonant circuit means comprises the primary of said high voltage transformer coupled in series circuit with said inverter circuit means and with said capacitor means.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

FIGS. 2A, 2B and 2C, taken together, form a schematic circuit diagram of a KVP regulator circuit in accordance with the invention; and FIG. 3 illustrates the proper arrangement of the sheets bearing FIGS. 2A, 2B and 2C.

DETAILED DESCRIPTION OF THE ILLUSTRATED EMBODIMENT

Figure 1:
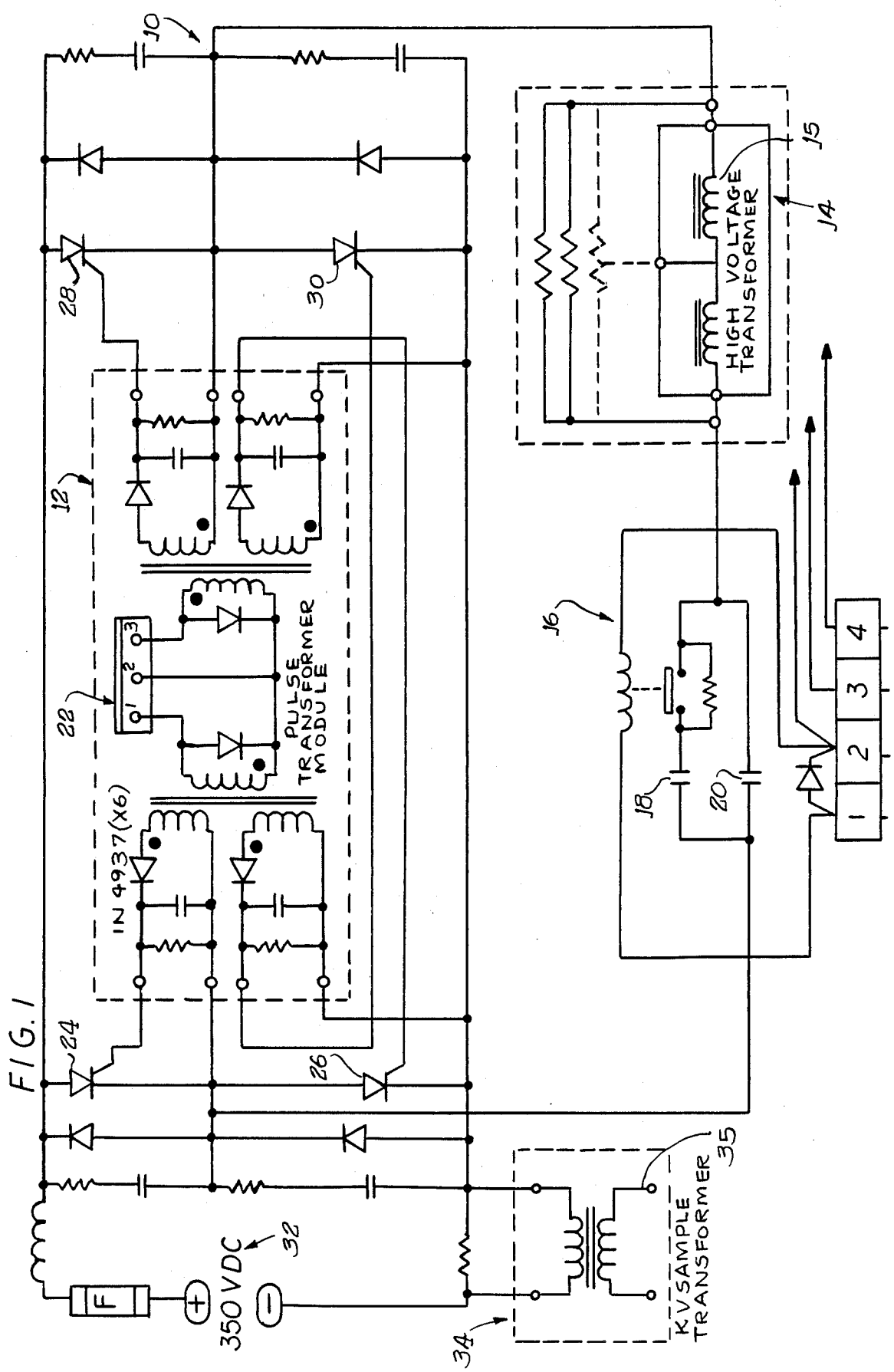
FIG. 1 is a schematic circuit diagram of a high voltage power supply circuit for a medical X-ray generator constructed in accordance with and embodying the present invention.
Figure 2A:
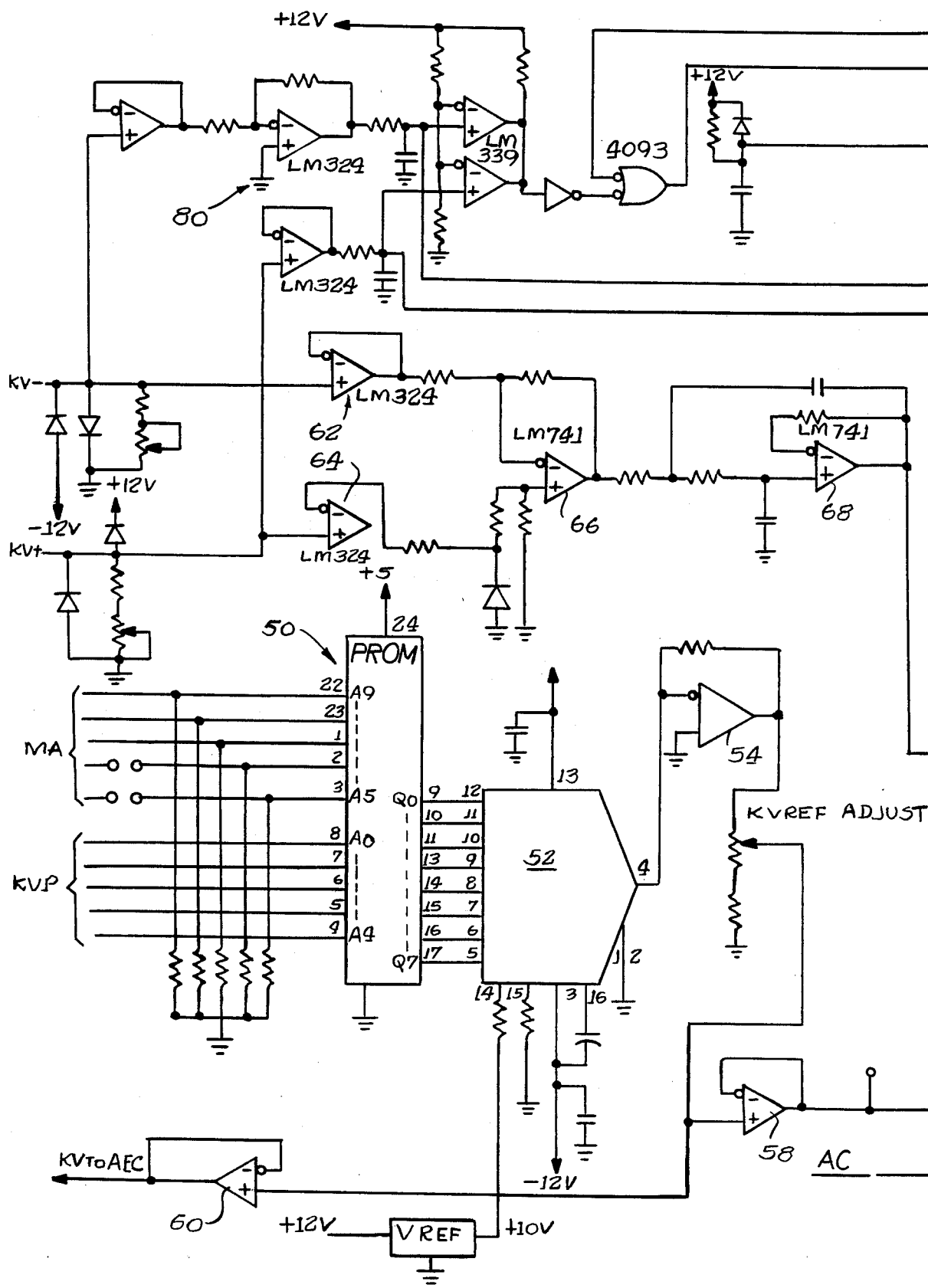
Figure 2B:
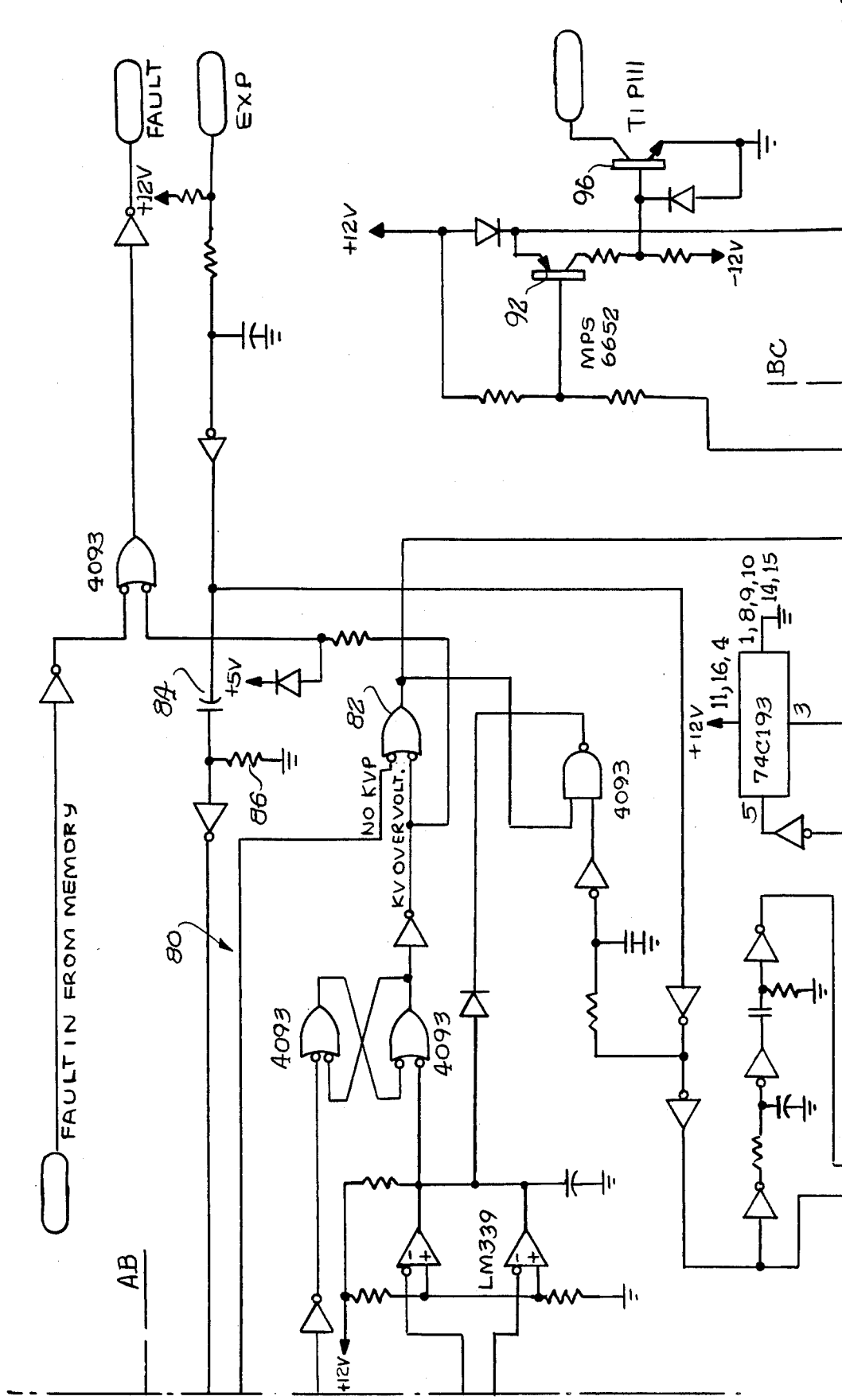

Referring now to the drawings and initially to FIG. 1, there is illustrated a high voltage power supply circuit for a medical X-ray generator. The circuit of FIG. 1 may be referred to as a self-commutating, resonant circuit and includes an inverter power supply or inverter circuit means designated by the reference numeral 10. The circuit 10 generates inverter output signals in the form of pulses in response to control input signals received at a pulse transformer module or circuit portion designated by the reference numeral 12. These inverter output pulses are fed to the primary coil 15 of a high voltage transformer 14, the secondary of which (not shown) develops the high voltage for the X-ray tube. The inverter output is also fed to a resonant circuit designated by the reference numeral 16 which includes a capacitive component or capacitor means 18, 20 and also an inductive component or inductor means 15.

In accordance with an important feature of the invention, the primary coil ("primary") 15 of the high voltage transformer 14 is coupled in series circuit with the inverter circuit and with the capacitor means 18 and 20, such that this high voltage transformer primary in effect forms the inductive component or inductor means of the resonant circuit. Heretofore, it has been the practice to utilize a separate inductive component or inductor for the resonant circuit and to couple the primary of the high voltage transformer across the capacitors 18, 20.

A KVP regulator circuit means, shown in detail in FIGS. 2A through 2D inclusive, produces the necessary control input signals for the pulse transformer module 12 in the form of a series of KVP firing pulses.

Referring first to the remaining details of FIG. 1, the pulse transformer circuit converts these KV firing pulses into gating control signals for controlling a plurality of controllable current gating circuit means interposed in circuit intermediate a source of AC current and the high voltage transformer primary. In the illustrated embodiment, the current gating means include four silicon-controlled rectifiers (SCRs) 24, 26, 28 and 30. These four SCRs are coupled across a current source, and preferably a 350 volt D.C. line 32. The aforementioned KV firing pulses are fed to primary coils of the pulse transformer module at inputs designated generally by reference numeral 22.

Accordingly, it will be seen that the SCRs are coupled in suitable polarities across positive and negative sides of the D.C. line for gating D.C. current into the high voltage transformer primary 15 and to the resonant circuit 16. In this regard, a train of KV pulses at input 22 will alternately turn on one or the other of the two pairs of SCRs 24, 30 and 26, 28, with the alternating polarities of the AC current. The resonant circuit 16 will in turn produce a single pulse of AC voltage, and as that pulse goes from positive to negative the SCRs will turn off (hence the above-mentioned designation "self commutating". In accordance with a further feature of the preferred embodiment illustrated herein, a KV sample transformer 34 is also coupled in circuit for sampling the KV current control pulses generated by the inverter circuit 10. The output or secondary coil 35 of this sample transformer 34 is coupled to a KV sampling or monitoring circuit portion of the KVP regulator circuit of FIG. 2, to which reference is now invited.

This KVP regulator circuit has a number of functions. For example, and referring initially to FIG. 2A, the circuit generates a reference signal based upon selected desired X-ray tube kilovoltage (KV or KVP) and milliamp-second (MAS) values, which values may be entered by an operator at a control panel or the like. In the illustrated embodiment, these desired or selected MA and KVP signals are fed to like-designated multiple-bit digital inputs of a programmable read only memory (PROM) 50, preferably of the type generally designated 2732. The digital signals are in effect translated or converted to a further "combined" digital format by the PROM 50 and fed to a digital to analog (D to A) conversion circuit 52, preferably of the type generally designated DAC08. The D to A converter circuit 52 outputs a current which is proportional to the selected KVP as influenced by the selected MAS.

The current output of converter circuit 52 is further converted to a voltage by an operational amplifier 54, preferably of the type generally designated LM 324. This voltage is suitably scaled and buffered to form a reference voltage input to a comparator 56 (see FIG. 2C) which is preferably of the type generally designated LM311. The reference KV signal may also be fed out for use in other related circuitry (not shown) by way of a suitable output buffer 60. The other input of the comparator 56 receives an actual summed kilovoltage signal which comprises the sum of the positive and negative going portions of the KV voltage as developed through an additive circuit comprising respective operational amplifiers 62, 64, 66 and a filter circuit including further operational amplifier 68. In the illustrated embodiment, a further control output is provided for developing a control signal when the actual KV value reaches a value greater than 75% of the selected KV value. This function is performed by a further comparator 57, also preferably of the type LM 311.

A first control signal at a four-input control logic gate 70 is thereby produced by the comparator 56 whenever the actual KV value is greater than the KV reference signal. Preferably, the gate 70 comprises a NAND gate of the type generally designated 4012.

A second control logic input to this gate 70 is developed by a so-called hold off circuit which inhibits the exposure for a minimum time duration following the previous inverter pulse. This holdoff circuit is designated generally by the reference numeral 72. This circuit receives the KV sample or monitor signal from the KV sample transformer 34 of FIG. 1 at the base electrode of a transistor 74. The illustrated circuit 72 provides a suitable logic signal to the gate 70 for preventing a second firing of the inverter bridge until some preselected minimum time has elapsed, to allow for or accommodate the turnoff time of the inverter circuit 10 of FIG. 1. This delay time is adjustable at a variable resistor 75.

A third logic control signal to control gate 70 operates to inhibit an exposure until a logic exposure control signal has been received. This control signal, generated by other circuitry not illustrated herein is received at an input EXP shown in FIG. 2B. A fourth and final logic input to the control gate 70 is developed by a circuit which will control the minimum time elapsed between the first and second firing pulses.

Accordingly, control gate 70 provides a gate pulse inhibitor circuit means which is responsible to the foregoing signals, for controlling production of the KV firing pulses. For example, the circuit means 70 is responsive to the holdoff signal developed by the holdoff circuit 72 for inhibiting production of KV firing pulses.

This holdoff circuit 72 thus essentially comprises a "detector" circuit for detecting the inverter circuit output signal at the KV sample transformer 34.

A further exposure inhibit circuit means provides "no KVP" protection, which inhibits exposure if there is no KVP output voltage within a predetermined time following the exposure command signal and KV firing pulse. That is, the circuit acts to inhibit production of a further KV firing pulse. This exposure inhibit circuit means generally includes circuitry designated generally by reference numeral 80 for monitoring the KV voltage and for providing a "no KVP" control signal at one input of a gate 82 in the event no KVP voltage is generated within a predetermined interval of the exposure signal EXP. This predetermined time delay or time interval is set by the selection of values of capacitor and resistor components 84, 86. In the illustrated embodiment, these components comprise 0.1 microfarads and 15K ohms, respectively, giving a delay time of substantially on the order of 1.5 milliseconds.

The gate 82 preferably comprises a two-input NOR gate, of the type generally designated 4093. This gate in turn feeds a tri-state buffer control circuit component 90, preferably of the type generally designated 80C79, which in turn controls the feeding of firing pulses to respective output transistors 92, 96 and 94, 98. It will be noted that it is these transistors 92, 96 and 94, 98 which provide the firing pulses or gate drive signals to energize the inverter bridge at the pulse transformer module 12, input 22, of FIG. 1

A further, KV overvoltage protection circuit includes elements of logic circuits 80 previously mentioned which develop a KV overvoltage control signal to a second input of the two-input gate 82. This signal also acts to inhibit the firing of the transistors 92, 94, 96, 98 through the buffer 90. This KV overvoltage signal also is tapped to provide a fault indication output which may energize a suitable indicator or the like (not shown) at a FAULT output. Some other fault input logic signal from a memory circuit (not shown) or the like may also be ORed to this same FAULT output.

Finally, a backup pulse producing circuit, designated generally by reference numeral 100, is provided for generating a backup pulse in the event that a KV pulse in the regular sequence of KV firing pulses is missed for some reason.

Normally, the inverter firing transistors 96 and 98 are alternately triggered dependent upon the logic inputs to the logic control gate 70. Hence, the exposure will be inhibited until a minimum time has elapsed since the previous pulse, until the logic exposure signal has been received and when the actual KVP value is lower than the reference KVP. In the event of a missed firing pulse, the backup trigger pulse provides the firing signal or pulse for these firing transistors 96, 98. The preferred types of circuit components comprising other elements of the illustrated circuit are as indicated in the illustration.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A KVP regulator circuit for a high frequency medical X-ray generator, said high frequency medical X-ray generator comprising a high voltage transformer, inverter circuit means responsive to KV firing pulses for producing corresponding inverter output signals and circuit means coupled with said inverter circuit means and responsive to said inverter output signals for producing corresponding voltage pulses for energizing said high voltage transformer, said KVP regulator circuit comprising: means for producing KV firing pulses, and exposure inhibit circuit means responsive to an exposure command signal and to absence of a KVP voltage within a predetermined time following both a KV firing pulse and an exposure command signal for inhibiting production of a further KV firing pulse.

2. A circuit according to claim 1 wherein said KVP regulator circuit further comprises overvoltage protection circuit means responsive to the value of the KV voltage being over a selected value for inhibiting production of said KV firing pulses.

3. A KVP regulator circuit for a high frequency medical X-ray generator, said high frequency medical X-ray generator comprising a high voltage transformer, inverter circuit means responsive to KV firing pulses for producing corresponding inverter output signals and circuit means couples with said inverter circuit means and responsive to said inverter output signals for producing corresponding voltage pulses for energizing said high voltage transformer, said KVP regulator circuit comprising: means for producing KV firing pulses, and backup pulse producing circuit means for producing a backup KV firing pulse in response to absence of a KV firing pulse.

4. A circuit according to claim 3 wherein said KVP regulator circuit means further comprises holdoff circuit means responsive to the production of each output signal by said inverter circuit means for inhibiting production of a further firing pulse for a predetermined time interval to accommodate the turnoff time of the inverter circuit means.

5. A circuit according to claim 4 wherein said holdoff circuit means comprises detector circuit means for detecting said inverter circuit output signal and for producing a corresponding holdoff control signal and gate pulse inhibitor circuit means responsive to said holdoff signal for inhibiting production of said KV firing pulse.

6. A circuit according to claim 3 wherein said KVP regulator circuit means further comprises exposure inhibit circuit means responsive to an exposure command signal and to absence of a KVP voltage within a predetermined time following both a KV firing pulse and an exposure command signal for inhibiting production of a further KV firing pulse.

7. A circuit according to claim 3 and further including overvoltage protection circuit means responsive to the value of the KV voltage being over a selected value for inhibiting production of said KV firing pulses.

8. A KVP regulator circuit for a high frequency medical X-ray generator, said high frequency medical X-ray generator comprising a high voltage transformer, inverter circuit means responsive to KV firing pulses for producing corresponding inverter output signals and circuit means coupled with said inverter circuit means and responsive to said inverter output signals for producing corresponding voltage pulses for energizing said high voltage transformer, said KVP regulator circuit comprising: means for producing KV firing pulses and holdoff circuit means responsive to the production of each output signal by said inverter circuit means for inhibiting production of a further firing pulse for a predetermined time interval to accommodate the turnoff time of the inverter circuit means.

9. A circuit according to claim 8 wherein said KVP regulator circuit further comprises exposure inhibit circuit means responsive to an exposure command signal and to absence of a KVP voltage within a predetermined time following both a KV firing pulse and an exposure command signal for inhibiting production of a further KV firing pulse.

10. A circuit according to claim 8 wherein said holdoff circuit means comprises detector circuit means for detecting said inverter circuit output signal and for producing a corresponding holdoff control signal and gate pulse inhibitor circuit means responsive to said holdoff signal for inhibiting production of said KV firing pulse.

11. A circuit according to claim 8 wherein said KVP regulator circuit further comprises overvoltage protection circuit means responsive to the value of the KV voltage being over a selected value for inhibiting production of said KV firing pulses.

* * * * *